United States Patent
Teichmann (10) Patent No.: US 9,077,205 B2
(45) Date of Patent: Jul. 7, 2015

(54) AUXILIARY EQUIPMENT SYSTEM AND METHOD OF OPERATING THE SAME

(75) Inventor: Ralph Teichmann, Niksayuna, NY (US)

(73) Assignee: General Electric Company, Schenectady, NY (US)

( * ) Notice: Subject to any disclaimer, the term of this patent is extended or adjusted under 35 U.S.C. 154(b) by 680 days.

(21) Appl. No.: 13/412,142

(22) Filed: Mar. 5, 2012

(65) Prior Publication Data

US 2013/0229056 A1  Sep. 5, 2013

(51) Int. Cl.
  *G05F 3/06* (2006.01)
  *H02J 3/38* (2006.01)

(52) U.S. Cl.
  CPC ........... *H02J 3/382* (2013.01); *H02J 3/386* (2013.01); *Y02E 10/763* (2013.01)

(58) Field of Classification Search
  CPC ...... Y02E 10/763; Y02E 10/76; Y02E 10/766
  USPC ............................................. 307/151; 30/151
  See application file for complete search history.

(56) References Cited

U.S. PATENT DOCUMENTS

| | | | |
|---|---|---|---|
| 6,958,583 B1 | 10/2005 | An | |
| 7,072,194 B2 | 7/2006 | Nayar et al. | |
| 8,121,738 B2 * | 2/2012 | Teichmann et al. | 700/287 |
| 2009/0206818 A1 | 8/2009 | Horan | |
| 2011/0144817 A1 * | 6/2011 | Teichmann et al. | 700/287 |

* cited by examiner

*Primary Examiner* — Daniel Cavallari
(74) *Attorney, Agent, or Firm* — James McGinness, Esq.; Armstrong Teasdale LLP (57) ABSTRACT

An auxiliary equipment system includes at least one auxiliary load bus configured to receive electric power having a voltage within a first voltage tolerance range. The auxiliary equipment system also includes at least one electric power supply conduit coupled to at least one electric power source. The electric power supply conduit is configured to transmit electric power having a voltage within a second voltage tolerance range. The second voltage tolerance range is greater than the first voltage tolerance range. The auxiliary equipment system further includes at least one controlled series transformer coupled to the auxiliary load bus and to the electric power supply conduit. The controlled series transformer is configured to receive electric power having a voltage within the second voltage tolerance range and transmit electric power having a voltage within the first voltage tolerance range.

20 Claims, 4 Drawing Sheets

AUXILIARY EQUIPMENT SYSTEM AND METHOD OF OPERATING THE SAME

BACKGROUND OF THE INVENTION

The subject matter described herein relates generally to electric power systems, and more specifically, to controlling operation of an auxiliary equipment system for a wind turbine.

Generally, a wind turbine includes a rotor that includes a rotatable hub assembly having multiple blades. The blades transform wind energy into a mechanical rotational torque that drives one or more generators via the rotor. At least some of the known wind turbines are physically nested together in a common geographical region to form a wind turbine farm. Variable speed operation of the wind turbine facilitates enhanced capture of energy as compared to energy capture during a constant speed operation of the wind turbine. However, variable speed operation of the wind turbine produces electric power with a varying voltage and/or frequency. More specifically, as is known, the frequency of the electric power generated by the variable speed wind turbine is proportional to the speed of rotation of the rotor. A power converter may be coupled between the wind turbine's electric generator and an electric utility grid. The power converter receives electric power from the wind turbine generator and transmits electricity with a fixed voltage and frequency to the utility grid via a transformer. Known transformers may be coupled to a plurality of power converters associated with the wind turbine farm.

Known wind turbines include auxiliary support equipment that facilitates operation of such wind turbines, for example, blade pitch drive motors, lubrication pump motors, and wind turbine control systems. Such auxiliary support equipment is powered by and receives at least a portion of electric power generated by the wind turbine generator or the electric utility grid. Moreover, such auxiliary support equipment typically has a predetermined voltage tolerance range. For example, at least some known support equipment may have a tolerance range that extends from 90% of nameplate voltage to 110% of nameplate voltage.

Many known electrical grids have voltage tolerance ranges that facilitate reliable electric power transmission and distribution over a wide variety of operational conditions to serve a broad market. For example, many known electrical grids include a grid voltage tolerance range that extends from less than 90% of nominally rated voltage to greater than 110% of nominally rated voltage. As such, many known wind turbines include auxiliary support equipment that is designed to operate within a voltage window that is not fully complimentary to the voltage window of the associated electrical grid. Exceeding the voltage tolerance ranges of the equipment may impair the operation of the equipment. Substituting, or replacing, such auxiliary support equipment with specialized equipment having broader electric power tolerances may be costly and may require an extended period of time that the wind turbine be removed from service.

BRIEF DESCRIPTION OF THE INVENTION

In one aspect, an auxiliary equipment system is provided. The auxiliary equipment system includes at least one auxiliary load bus configured to receive electric power having a voltage within a first voltage tolerance range. The auxiliary equipment system also includes at least one electric power supply conduit coupled to at least one electric power source. The electric power supply conduit is configured to transmit electric power having a voltage within a second voltage tolerance range. The second voltage tolerance range is greater than the first voltage tolerance range. The auxiliary equipment system further includes at least one controlled series transformer coupled to the auxiliary load bus and to the electric power supply conduit. The controlled series transformer is configured to receive electric power having a voltage within the second voltage tolerance range and transmit electric power having a voltage within the first voltage tolerance range.

In another aspect, a method of operating an auxiliary equipment system for a renewable electric power generation facility is provided. The renewable electric power generation facility includes at least one auxiliary load bus and an electric power supply conduit. The method includes maintaining a voltage on the auxiliary load bus within a first voltage tolerance range while a voltage on the electric power supply conduit varies within a second voltage tolerance range. The second voltage tolerance range is greater than the first voltage tolerance range.

In yet another aspect, a renewable energy generation facility is provided. The facility includes at least one renewable energy generator and a power converter coupled to the renewable energy generator and coupled to an electric power grid. The facility also includes an auxiliary equipment system that includes at least one auxiliary load bus configured to receive electric power having a voltage within a first voltage tolerance range. The auxiliary equipment system also includes at least one electric power supply conduit coupled to at least one of the power converter and the electric power grid. The electric power supply conduit is configured to transmit electric power having a voltage within a second voltage tolerance range. The second voltage tolerance range is greater than the first voltage tolerance range. The auxiliary equipment system further includes at least one controlled series transformer coupled to the auxiliary load bus and to the electric power supply conduit. The controlled series transformer is configured to receive electric power having a voltage within the second voltage tolerance range and transmit electric power having a voltage within the first voltage tolerance range.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "electric power generation device" is intended to be representative of any device that provides electric power derived from an energy resource. As used herein, the term "wind turbine generator" is intended to be representative of any wind turbine that includes an electric power generation device that generates electrical power from rotational energy generated from wind energy, and more specifically, converts mechanical energy converted from kinetic energy of wind to electrical power.

Technical effects of the methods, apparatus, and systems described herein include at least one of: (a) maintaining a stable voltage to auxiliary equipment in renewable electric power generation assets; (b) maintaining a stable voltage to auxiliary equipment during voltage transients induced by electric power grid disturbances, wherein the grid has a greater voltage tolerance range than the auxiliary equipment; (c) maintaining a stable voltage to auxiliary equipment during voltage transients induced by renewable generation transients; (d) facilitating continued use of a broad range of auxiliary equipment with industry standard voltage ratings and tolerances; and (e) maintaining a predetermined power quality of power transmitted to auxiliary equipment.

The methods, apparatus, and systems described herein facilitate transmitting electric power with a voltage within conventional industry tolerances to auxiliary equipment in renewable electric power generation assets. Specifically, the methods, apparatus, and systems described herein facilitate maintaining a standard tolerance voltage for electric power transmitted to auxiliary equipment during voltage transients induced by electric power grid variations, wherein the grid has a greater voltage tolerance range than the auxiliary equipment. Such grid variations include grid disturbances that may include a low and/or a zero voltage ride through (LVRT and ZVRT, respectively) event. Also, the methods, apparatus, and systems described herein facilitate maintaining a stable voltage to auxiliary equipment during voltage transients induced by renewable generation transients. Further, the methods, apparatus, and systems described herein facilitate eliminating activities that include substituting, or replacing, such auxiliary support equipment with specialized equipment having broader electric power tolerances may incur exorbitant capital expenditures, as well as an extended period of time that an existing wind turbine undergoing renovation is removed from service.

In addition, the methods, apparatus, and systems described herein facilitate implementation of a low cost option as compared to such wholesale auxiliary equipment substitution/replacement, including installation of a conventional, stand-alone, uninterruptible power supply (UPS). Specifically, the methods, apparatus, and systems described herein use smaller, i.e., having a smaller physical footprint, and less expensive electronics with lower ratings, since only reactive power is injected and real power is not injected as compared to known auxiliary power systems. Also, in the event of a failure of the apparatus described herein, the configuration described herein facilitates continued operation of auxiliary equipment within the nominal voltage tolerance band.

Although generally described herein with respect to a wind turbine facility, the methods and systems described herein are applicable to any type of electric generation system including, for example, solar power generation systems, fuel cells, thermal power generators, geothermal generators, hydropower generators, diesel generators, gasoline generators, and/or any other device that generates power from renewable and/or non-renewable energy sources.

Figure 1:
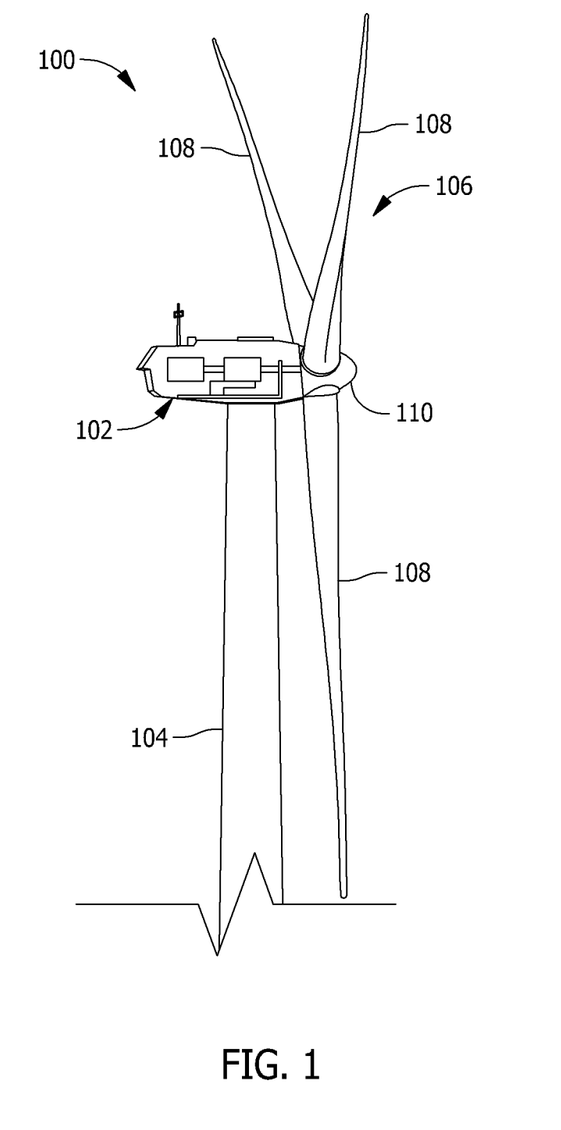
FIG. 1 is a schematic view of an exemplary wind turbine.

FIG. 1 is a schematic view of an exemplary wind turbine generator 100. Wind turbine generator 100 is an electric power generation device including a nacelle 102 housing a generator (not shown in FIG. 1). Nacelle 102 is mounted on a tower 104 (a portion of tower 104 being shown in FIG. 1). Tower 104 may be any height that facilitates operation of wind turbine generator 100 as described herein. Wind turbine generator 100 also includes a rotor 106 that includes three rotor blades 108 attached to a rotating hub 110. Alternatively, wind turbine generator 100 includes any number of blades 108 that facilitates operation of wind turbine generator 100 as described herein. In the exemplary embodiment, wind turbine generator 100 includes a gearbox (not shown in FIG. 1) rotatably coupled to rotor 106 and a generator (not shown in FIG. 1). While only one wind turbine generator 100 is shown, a plurality of wind turbine generators 100 may be at least partially grouped geographically and/or electrically to define a renewable energy generation facility, i.e., a wind turbine farm (not shown). Such a wind turbine farm may be defined by a number of wind turbine generators 100 in a particular geographic area, or alternatively, defined by the electrical connectivity of each wind turbine generator 100 to a common substation.

Figure 2:
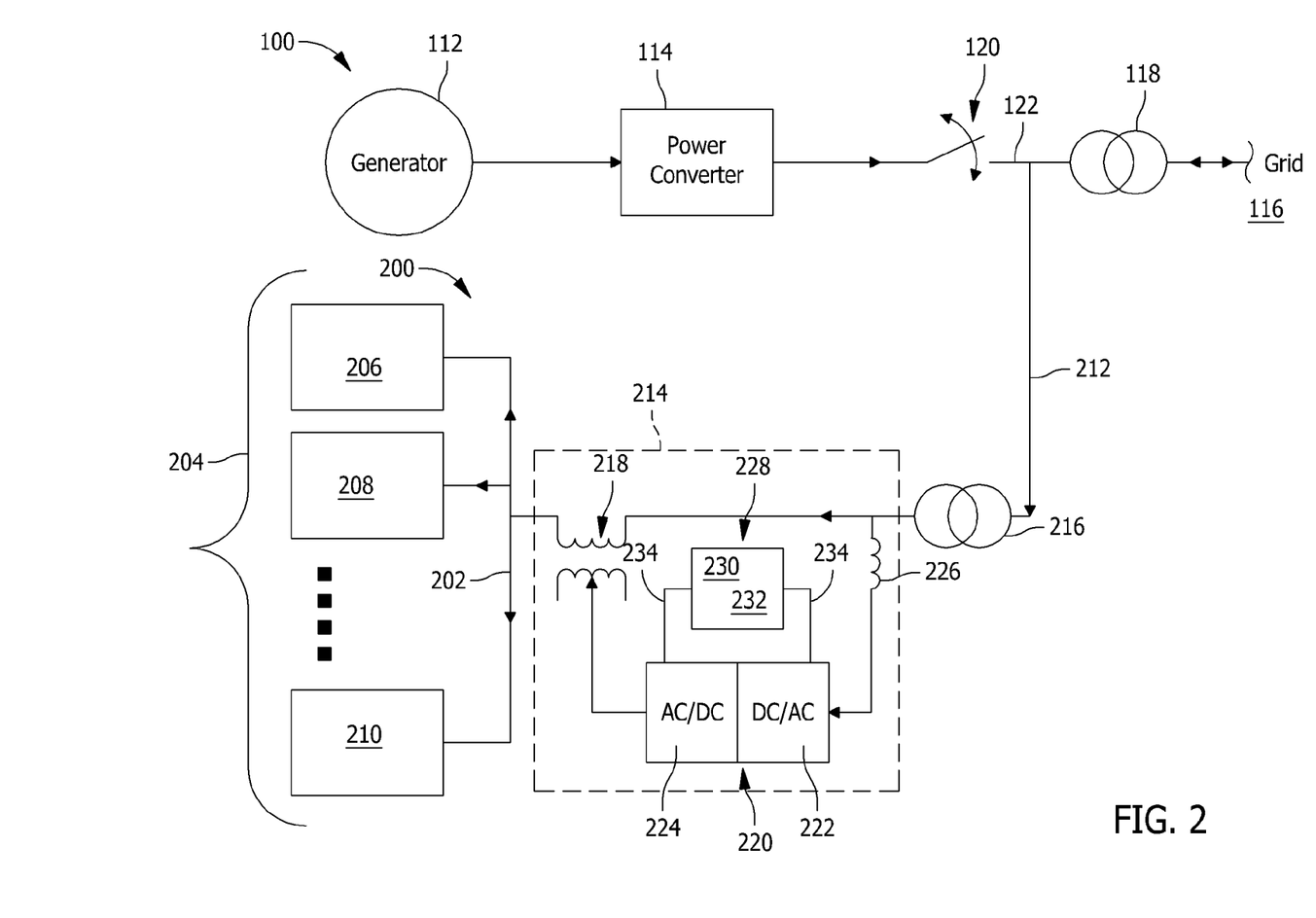
FIG. 2 is a schematic view of an exemplary auxiliary equipment system that may be used with the wind turbine shown in FIG. 1.

FIG. 2 is a schematic view of an exemplary auxiliary equipment system 200 that may be used with wind turbine generator 100. In the exemplary embodiment, wind turbine generator 100 is a renewable energy source that includes an electric power generator 112 coupled to a first power source, i.e., a power converter 114. Electric power generator 112 is any type of generator that enables operation of wind turbine generator 100 as described herein, including, without limitation, a synchronous permanent magnet generator (PMG), an electrically excited synchronous generator (EESG), and a doubly-fed induction generator (DFIG).

Power converter 114 is any device that enables operation of wind turbine generator 100 as described herein, including, without limitation, a full power conversion assembly. In the exemplary embodiment, electrical, three-phase, sinusoidal, AC power generated within electric power generator 112 is transmitted to power converter 114. Within power converter 114, the electrical power is rectified from sinusoidal, three-phase AC power to direct current (DC) power. The DC power is transmitted to an inverter (not shown) that converts the DC electrical power to three-phase, sinusoidal AC electrical power with pre-determined voltages, currents, and frequencies. Power converter 114 compensates or adjusts the frequency of the three-phase power from electric power generator 112 for changes, for example, in the wind speed at hub 110 and blades 108 (both shown in FIG. 1). Therefore, in this manner, mechanical and electrical rotor frequencies are decoupled from grid frequency.

Power converter 114 is coupled to an electric power grid 116 via a main transformer 118, a main transformer circuit breaker 120, and a main transformer bus 122. When circuit breaker 120 is closed, three-phase AC electric power is transmitted from power converter 114 to electric power grid 116.

In the exemplary embodiment, auxiliary equipment system 200 includes an auxiliary load bus 202. Auxiliary equipment system 200 also includes a plurality of auxiliary equipment 204 coupled to auxiliary load bus 202, including, without limitation, turbine controls 206, a pitch system 208, and fans and pumps 210. Auxiliary equipment system 200 also includes an electric power supply conduit 212 coupled to main transformer bus 122 and electric power grid 116 through main transformer 118, wherein electric power grid 116 is an electric power source. Also, in the exemplary embodiment, auxiliary equipment system 200 includes a unified power flow controller (UPFC) 214 coupled to electric power supply conduit 212 through a step-down transformer 216.

In the exemplary embodiment, UPFC 214 is also coupled to auxiliary load bus 202. UPFC 214 includes a controlled series transformer 218 that is coupled to step-down transformer 216 and to auxiliary load bus 202. UPFC 214 also includes a voltage source converter (VSC) 220 coupled to controlled series transformer 218 and coupled to step-down transformer 216. VSC 220 includes an AC-to-DC conversion device, e.g., a rectifier portion 222. VSC 220 also includes a DC-to-AC conversion device, e.g., an inverter portion 224, coupled through a DC bus (not shown) to rectifier portion 222. Rectifier portion 222 is coupled to step-down transformer 216 through a shunt inductive device 226. Rectifier portion 222 facilitates power factor control of bus 212 and at the same time provides a stable DC bus voltage to facilitate voltage control at bus 202 through inverter portion 224 of VSC 220.

In the exemplary embodiment, rectifier portion 222 and inverter portion 224 include any type of switching device that enables operation of auxiliary equipment system 200 as described herein, including, without limitation, insulated gate bipolar transistors (IGBTs) and gate turn-off thyristors (GTOs). Some considerations for selecting the switch devices include, without limitation, cost and operational switching speed, i.e., the firing rate of each switch type. Rectifier portion 222 and inverter portion 224 include any type of converter architecture that enables operation of auxiliary equipment system 200 as described herein, including, without limitation, single and three-phase converters or two-level or multi-level converters.

Also, in the exemplary embodiment, VSC 220 is rated for approximately 10% to 20% of the total rated electrical loading of auxiliary load bus 202 and/or auxiliary equipment 204. Such rating is usually sufficient to transmit reactive power to controlled series transformer 218 to facilitate voltage control of auxiliary load bus 202. The rating corresponds to the relative, steady state reduction of the voltage tolerance band between buses 212 and 202 as well as the desired relative power factor correction to be achieved by VSC 220 and UPFC 214.

Further, in the exemplary embodiment, auxiliary equipment system 200 includes a UPFC control system 228 that includes at least one processor 230 and a memory device 232 coupled to processor 230. Also, in the exemplary embodiment, UPFC control system 228 includes at least one input/output (I/O) conduit 234 coupled to VSC 220, wherein conduit 234 includes at least one I/O channel (not shown). Processor 230 and memory device 232 are coupled VSC 220 by at least one I/O conduit 234. I/O conduit 234 includes any number of channels having any architecture including, but not limited to, Cat 5/6 cable, twisted pair wiring, and wireless communication features. UPFC control system 228 may include distributed and/or centralized control architectures, or any combination thereof. UPFC control system 228 provides a technical effect of controlling voltage values on auxiliary load bus 202 within a predetermined voltage tolerance range as described herein.

As used herein, the term processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Processor 230 and other processors (not shown) as described herein process information transmitted from a plurality of electrical and electronic devices that may include, but are not limited to, voltage and current feedback devices (none shown). Such feedback devices may be positioned such that they are coupled to grid 116, main transformer bus 122, electric power supply conduit 212 (upstream and downstream of step-down transformer 216), and auxiliary load bus 202.

Memory device 232 and storage devices (not shown) store and transfer information and instructions to be executed by processor 230. Memory devices 232 and the storage devices can also be used to store and provide temporary variables, static (i.e., non-changing) information and instructions, or other intermediate information to processor 230 during execution of instructions by processor 230. Instructions that are executed include, but are not limited to, voltage target and switching device firing rate control commands to VSC 220. The execution of sequences of instructions is not limited to any specific combination of hardware circuitry and software instructions.

In some alternative embodiments, a combination of electric power generation devices are used in conjunction with, or in place of, wind turbine generator 100. In at least one alternative embodiment, wind turbine generator 100 is replaced with solar panels (not shown) coupled to form one or more solar arrays (not shown) to facilitate operating at a desired power output with supplemental, solar-generated power. Solar panels include, in one alternative embodiment, one or more of a photovoltaic panel, a solar thermal collector, or any other device that converts solar energy to electrical energy. In such alternative embodiments, each solar panel is a photovoltaic panel that generates a substantially direct current power as a result of solar energy striking solar panels.

Also, in such alternative embodiments, each solar array is coupled to a power converter that is similar to at least a portion of power converter 114 that converts the DC power to AC power that is transmitted to a transformer, similar to transformer 118, and then subsequently to grid 116. Furthermore, although generally described herein with respect to wind turbine generator 100 and a solar array facility, the methods and systems described herein are applicable to any type of electric generation system, with or without a power converter, including, for example, fuel cells, thermal power generators, geothermal generators, hydropower generators, diesel generators, gasoline generators, and/or any other device that generates power from renewable and/or non-renewable energy sources.

In operation, when generator 112 is in service and main transformer circuit breaker 120 is closed, or when generator 112 is removed from service and main transformer circuit breaker 120 is open, at least some auxiliary equipment 204 may be needed to support wind turbine generator 100. For example, without exception, turbine controls 206 may require near-constant energization to facilitate remote monitoring and control of wind turbine generator 100, pitch system 208 may need to be exercised at least occasionally to verify operation, and fans and pumps 210 may be needed to facilitate continuous equipment cooling and bearing lubrication, respectively. Therefore, electric power is transmitted from electric power grid 116 through auxiliary equipment system 200 to energize auxiliary load bus 202.

As such, in operation, electric power is backfed through main transformer 118 to energize electric power supply conduit 212 through main transformer bus 122. The electric power, including both real and reactive power components, is transmitted through step-down transformer 216 to reduce the voltage values induced by main transformer bus 122 to voltage values that are closer to those required for auxiliary equipment 204.

Also, in operation, electric power is transmitted to auxiliary load bus 202 through UPFC 214. Specifically, electric power is transmitted to auxiliary load bus 202 through controlled series transformer 218 to power auxiliary equipment 204 with the real and reactive power components. Also, at least some of the electric power is transmitted from step-down transformer 216 to rectifier portion 222 of VSC 220 through shunt inductive device 226, wherein inductive device 226 decouples rectifier portion 222. Rectifier portion 222 injects reactive current through inductive device 226 into grid 116 while at the same time drawing a small amount of real power to be transmitted via DC electric power to inverter portion 224. Inverter portion 224 converts the DC electrical power to sinusoidal AC electric power with pre-determined voltages, currents, and frequencies. Electric power that is mostly reactive power is transmitted from inverter portion 224 of VSC 220 to controlled series transformer 218, wherein the reactive power transmitted from VSC 220 controls the voltage of the electric power transmitted from transformer 218 to auxiliary load bus 202.

In the exemplary embodiment, auxiliary equipment 204 fed off of auxiliary load bus 202 is configured to receive electric power having a voltage within a first voltage tolerance range. Typically, and in the exemplary embodiment, such voltage tolerance range extends between 10% above and below a predetermined voltage of auxiliary load bus 202. For example, without limitation, for auxiliary equipment 204 having a nameplate voltage rating of 120 VAC, the voltage tolerance range will be 24 VAC extending from 108 VAC to 132 VAC. Alternatively, any voltage tolerance range for any rated voltage that enables operation of auxiliary equipment system 200 as described herein is used.

Also, in the exemplary embodiment, the voltage tolerance range of electric power grid 116 may exceed the ±10% range of auxiliary equipment 204. For example, and without limitation, the voltage tolerance range of grid 116 may extend between 15% above and below a predetermined voltage of grid 116. Therefore, for 120 VAC, such a voltage tolerance range will be 36 VAC extending from 102 VAC to 138 VAC. However, such a range is 6 VAC above and below the voltage tolerance range of auxiliary equipment 204. In general, electrically-driven equipment rated for 120 VAC±10% will not operate properly with voltages outside of their voltage tolerance range. Therefore, in operation, UPFC 214 controls the voltage induced on auxiliary load bus 202 to the voltage tolerance range of 120 VAC±10% regardless of the voltage of grid 116 varying within the greater tolerance range of 120 VAC±15% as measured on electric power supply conduit 212 downstream from step-down transformer 216. As the voltage on grid 116 varies, mostly reactive power is transmitted from VSC 220 and transmitted to controlled series transformer 218. The magnitude of the reactive power voltage transmitted to controlled series transformer 218 may be positive or negative in magnitude as necessary. Therefore, transformer 218 induces a voltage onto auxiliary load bus 202 that is varied with positive and negative adjustments with respect to magnitude, and varied in phase, to maintain the voltage within the predetermined voltage tolerance band of, for example, 120 VAC±10%.

Further, in the exemplary embodiment, rectifier portion 222 facilitates control of the power quality such that electric power transmitted to grid bus 212 is maintained within predetermined parameters. In addition, in the event of removal of VSC 220 from service due to maintenance or failure, controlled series transformer 218 of system 200 facilitates continued energization of auxiliary load bus 202, albeit, without the voltage corrective features of UPFC 214.

Further, in operation, when generator 112 is in service and main transformer circuit breaker 120 is closed, auxiliary equipment 204 supports operation of wind turbine generator 100. For example, turbine controls 206 may be energized to facilitate remote monitoring and control of wind turbine generator 100, to enable pitch system 208 to vary a pitch angle of blades 108, and to enable fans and pumps 210 to continuously cool equipment and lubricate bearings. In a manner similar to that described above when wind turbine generator 100 is removed from service and main transformer circuit breaker 120 is open, as the voltage on main transformer bus 122 varies due to voltage transients induced by at least one of power converter 114 and grid 116, or due to interaction between the two, and as the voltage on electric power supply conduit 212 varies, reactive power is transmitted from VSC 220 and transmitted to controlled series transformer 218. Transformer 218 induces a voltage difference between supply conduit 212 and load bus 202 that is varied with respect to magnitude and phase to maintain the voltage on load bus 202 within the predetermined voltage tolerance band of 120 VAC±10%. Therefore, auxiliary equipment system 200 facilitates voltage control and power quality control on auxiliary load bus 202 such that electric power transmitted to auxiliary equipment 204 is maintained within predetermined parameters.

In the exemplary embodiment, wind turbine generator 100 and power converter 114 are configured to be able to operate through certain grid events occurring downstream from transformer 122. Such grid events may include electrical faults that, under certain circumstances, may induce grid voltage fluctuations that may include low voltage transients with voltage fluctuations that approach zero volts. Wind turbine generator 100 and power converter 114 include at least some protective devices and systems that facilitate continued operation during certain grid events. For example, for grid transients such as short circuits, a low or zero voltage condition may occur on the grid. Under such conditions, such known protective devices and systems define a low and/or a zero voltage ride through (LVRT and ZVRT, respectively) capability. Auxiliary equipment system 200 facilitates voltage control and power quality control on auxiliary load bus 202 such that electric power transmitted to auxiliary equipment 204 is maintained within predetermined parameters during such LVRT and ZVRT events.

In an alternative embodiment, auxiliary equipment system 200 does not include step-down transformer 216. Therefore, operation of auxiliary equipment system 200 is similar to operation as described above with the exception that the voltage on electric power supply conduit 212 is substantially similar to the voltage on main transformer bus 122. Also, main transformer bus 122 is coupled to an alternative main transformer (not shown) that is configured to back feed electric power from grid 116 to bus 122 at a voltage similar to the voltage rating of auxiliary equipment 204.

In yet another alternative embodiment, auxiliary equipment system 200 does not include shunt inductive device 226. Therefore, operation of auxiliary equipment system 200 is similar to operation as described above with the exception that inverter portion 224 draws a small real power amount while regulating the voltage difference between conduit 212 and bus 202 via controlled series transformer 218. In that embodiment, system 220 cannot independently contribute to power factor control while regulating voltage on bus 202. Therefore, rectifier portion 222 is a uni-directional rectifier providing a DC voltage to inverter portion 226.

Figure 3:
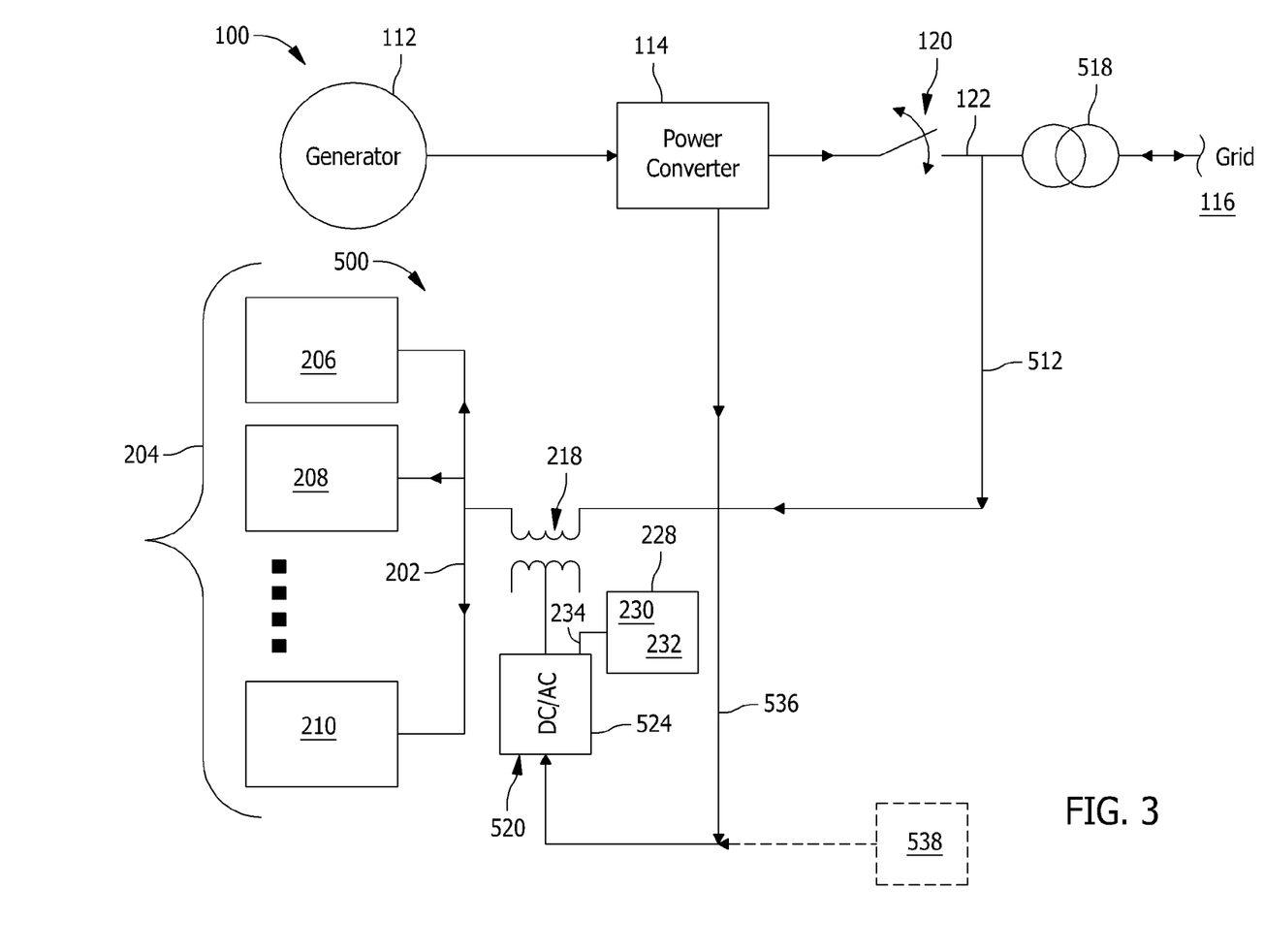
FIG. 3 is a schematic view of another alternative auxiliary equipment system that may be used with the wind turbine shown in FIG. 1.

FIG. 3 is a schematic view of yet another alternative auxiliary equipment system 500 that may be used with wind turbine generator 100. In this alternative embodiment, auxiliary equipment system 500 is coupled to power converter 114. Also, main transformer bus 122 is coupled to an alternative main transformer 518 that is configured to back feed electric power from grid 116 to bus 122 at a voltage similar to the voltage rating of auxiliary equipment 204. Further, auxiliary equipment system 500 includes an alternative electric power supply conduit 512 that couples controlled series transformer 218 directly to main transformer bus 122. Further, auxiliary equipment system 500 includes an alternative VSC 520 that includes an alternative inverter portion 524 and does not include a rectifier portion. Inverter portion 524 is coupled to a DC portion of converter 114 through a DC conduit 536, wherein converter 114 is a source to VSC 520. Alternatively, inverter portion 524 is coupled to another DC source, including, without limitation, a battery unit 538 (shown in phantom).

Rather, VSC 520 receives AC electric power transmitted from power converter 114 through AC conduit 536 and rectifies the AC electric power to DC electric power. The DC electric power is transmitted to controlled series transformer 218, wherein the voltage of the DC power is varied to vary the voltage of the AC electric power transmitted from controlled series transformer 218 to auxiliary load bus 202.

Operation of auxiliary equipment system 500 differs from that of auxiliary equipment system 200 (shown in FIG. 2). For example, in contrast to VSC 220 (shown in FIG. 2), VSC 520 performs no AC-to-DC conversion. Rather, while VSC 520 regulates the bus voltage tolerance of bus 202 in the same manner as system 200, the power factor regulation supported by rectifier portion 222 is now integrated in the grid side converter 114. Converter 114 provides the balance of power via DC bus 536 to system 500 compensating for inevitable conversion losses.

Figure 4:
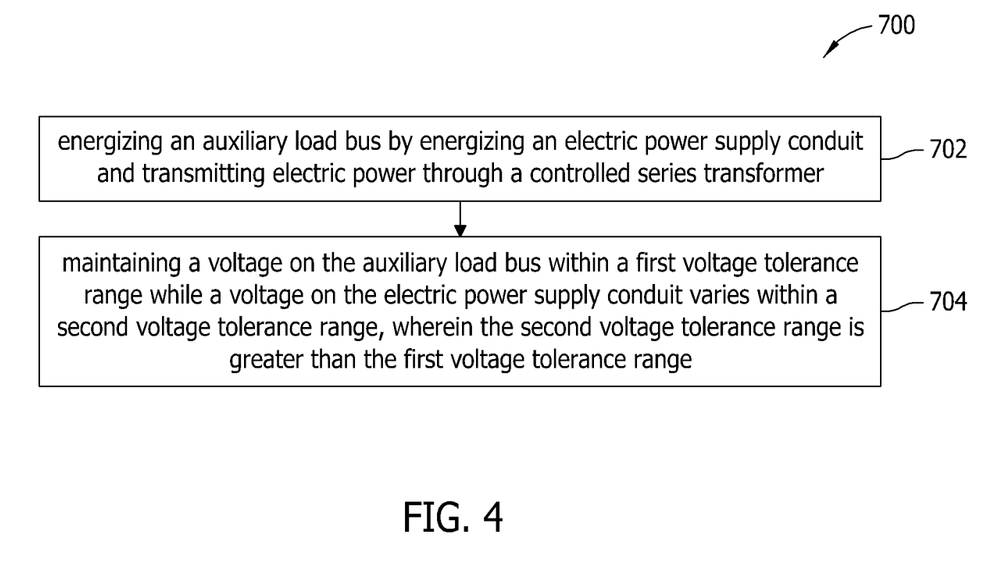
FIG. 4 is a flowchart of an exemplary method that may be used in operating the auxiliary equipment systems shown in FIGS. 2 and 3.

FIG. 4 is a flowchart of an exemplary method 700 that may be implemented to operate auxiliary equipment systems 200 and 500 (shown in FIGS. 2 and 3, respectively). In the exemplary embodiment, auxiliary load bus 202 (shown in FIGS. 2 and 3) is energized 702 by energizing electric power supply conduit 212 (shown in FIG. 2) and 512 (shown in FIG. 3) and transmitting electric power through controlled series transformer 218 (shown in FIGS. 2 and 3). Also, a voltage on auxiliary load bus 202 is maintained 704 within a first voltage tolerance range while a voltage on electric power supply conduits 212 and 512 varies within a second voltage tolerance range that is greater than the first voltage tolerance range.

The above-described embodiments facilitate efficient and cost-effective operation of an electric power generation assets, including renewable electric power generation facilities such as wind turbine generators and a solar arrays. The renewable electric power generation facility includes an auxiliary equipment system that facilitates transmitting electric power with a stable voltage within prescribed tolerance bands to auxiliary equipment. Specifically, the auxiliary equipment system facilitates maintaining a stable voltage within a prescribed tolerance band for the electric power transmitted to auxiliary equipment during voltage transients induced by electric power grid disturbances. Such grid disturbances may include a low and/or a zero voltage ride through (LVRT and ZVRT, respectively) event, wherein the grid has a greater voltage tolerance range than the auxiliary equipment. Also, the auxiliary equipment system facilitates maintaining a stable voltage to auxiliary equipment during voltage transients induced by renewable generation transients. Further, the auxiliary equipment system facilitates eliminating activities that include substituting, or replacing, such auxiliary support equipment with specialized equipment having broader electric power tolerances may incur exorbitant capital expenditures, as well as an extended period of time that an existing wind turbine undergoing renovation is removed from service.

Exemplary embodiments of auxiliary equipment systems and methods for operating such auxiliary equipment systems are described above in detail. The methods and auxiliary equipment systems are not limited to the specific embodiments described herein, but rather, components of the auxiliary equipment systems, and/or steps of the methods may be utilized independently and separately from other components and/or steps described herein. For example, the auxiliary equipment systems and methods may also be used in combination with other industrial auxiliary power supply systems and electric power generation systems and methods, and are not limited to practice with only the renewable electric power generation facilities as described herein. Rather, the exemplary embodiment can be implemented and utilized in connection with many other system and facility applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An auxiliary equipment system comprising:
  at least one auxiliary load bus configured to receive electric power having a voltage within a first voltage tolerance range;
  at least one electric power supply conduit coupled to at least one electric power source, said electric power supply conduit configured to transmit electric power having a voltage within a second voltage tolerance range, wherein the second voltage tolerance range is greater than the first voltage tolerance range; and,
  at least one controlled series transformer coupled to said auxiliary load bus and to said electric power supply conduit, said controlled series transformer configured to:
    receive electric power having a voltage within the second voltage tolerance range; and,
    transmit electric power having a voltage within the first voltage tolerance range.

2. An auxiliary equipment system in accordance with claim 1, further comprising a unified power flow controller (UPFC) comprising at least one voltage source converter (VSC) coupled to said controlled series transformer and to said electric power supply conduit.

3. An auxiliary equipment system in accordance with claim 2, wherein said VSC comprises at least one of:
   an alternating current (AC)-to-direct current (DC) conversion device; and,
   a DC-to-AC conversion device.

4. An auxiliary equipment system in accordance with claim 1, wherein said electric power supply conduit is coupled to at least one of an electric power grid and a power converter.

5. An auxiliary equipment system in accordance with claim 4, wherein the power converter is coupled to at least one renewable electric power generator.

6. An auxiliary equipment system in accordance with claim 1, further comprising at least one auxiliary load that facilitates operation of a renewable electric power generator coupled to said auxiliary load bus.

7. An auxiliary equipment system in accordance with claim 1, wherein:
   the first voltage tolerance range extends between 10% above a predetermined voltage of said auxiliary load bus and 10% below the predetermined voltage of said auxiliary load bus; and,
   the second voltage tolerance range extends between values greater than 10% above a predetermined voltage of said electric power supply conduit and varies greater than 10% below the predetermined voltage of said electric power supply conduit.

8. A method of operating an auxiliary equipment system for a renewable electric power generation facility including at least one auxiliary load bus and an electric power supply conduit, said method comprising maintaining a voltage on the auxiliary load bus within a first voltage tolerance range while a voltage on the electric power supply conduit varies within a second voltage tolerance range, wherein the second voltage tolerance range is greater than the first voltage tolerance range.

9. A method in accordance with claim 8, wherein the auxiliary equipment system also includes at least one controlled series transformer coupled to the auxiliary load bus and the electric power supply conduit, wherein maintaining a voltage on the auxiliary load bus within a first voltage tolerance range comprises energizing a unified power flow controller (UPFC), wherein the UPFC includes the controlled series transformer coupled in series with a voltage source converter (VSC).

10. A method in accordance with claim 9, wherein maintaining a voltage on the auxiliary load bus within a first voltage tolerance range comprises injecting electric power into the controlled series transformer from the VSC, wherein the electric power injected into the controlled series transformer is reactive power.

11. A method in accordance with claim 9, further comprising energizing the auxiliary load bus by energizing the electric power supply conduit and transmitting electric power through the controlled series transformer comprising transmitting electric power from at least one of an electric power grid, a power converter coupled to a renewable electric power generator, and a battery system.

12. A method in accordance with claim 11, wherein energizing the auxiliary load bus further comprises energizing at least one auxiliary load coupled to the auxiliary load bus to facilitate operation of a renewable electric power generator.

13. A method in accordance with claim 8, wherein maintaining a voltage on the auxiliary load bus within a first voltage tolerance range comprises maintaining the voltage on the auxiliary load bus within a voltage tolerance range that extends between 10% above a predetermined voltage of the auxiliary load bus and 10% below the predetermined voltage of the auxiliary load bus, wherein the voltage on the electric power supply conduit varies within a voltage tolerance range that extends between values greater than 10% above a predetermined voltage of the electric power supply conduit and greater than 10% below the predetermined voltage of the electric power supply conduit.

14. A renewable energy generation facility comprising:
   at least one renewable energy generator;
   a power converter coupled to said renewable energy generator and coupled to an electric power grid; and,
   an auxiliary equipment system comprising:
      at least one auxiliary load bus configured to receive electric power having a voltage within a first voltage tolerance range;
      at least one electric power supply conduit coupled to at least one of said power converter and the electric power grid, said electric power supply conduit configured to transmit electric power having a voltage within a second voltage tolerance range, wherein the second voltage tolerance range is greater than the first voltage tolerance range; and,
      at least one controlled series transformer coupled to said auxiliary load bus and to said electric power supply conduit, said controlled series transformer configured to:
         receive electric power having a voltage within the second voltage tolerance range; and,
         transmit electric power having a voltage within the first voltage tolerance range.

15. A facility in accordance with claim 14, further comprising a unified power flow controller (UPFC) comprising at least one voltage source converter (VSC) coupled to said controlled series transformer and said electric power supply conduit.

16. A facility in accordance with claim 15, wherein said VSC comprises at least one of:
   an alternating current (AC)-to-direct current (DC) conversion device; and,
   a DC-to-AC conversion device.

17. A facility in accordance with claim 15, wherein said VSC is configured to transmit only reactive power to said controlled series transformer.

18. A facility in accordance with claim 14, wherein said renewable electric power generator is at least one of a wind turbine generator and a solar generation array.

19. A facility in accordance with claim 14, further comprising at least one auxiliary load that facilitates operation of said renewable electric power generator coupled to said auxiliary load bus.

20. A facility in accordance with claim 14, wherein:
   the first voltage tolerance range extends between 10% above a predetermined voltage of said auxiliary load bus and 10% below the predetermined voltage of said auxiliary load bus; and,
   the second voltage tolerance range extends between values greater than 10% above a predetermined voltage of said electric power supply conduit and varies greater than 10% below the predetermined voltage of said electric power supply conduit.

* * * * *